(12) United States Patent
Xue et al.

(10) Patent No.: US 12,196,606 B2
(45) Date of Patent: Jan. 14, 2025

(54) OPTICAL-PATH CALIBRATION MODULE

(71) Applicant: Guangzhou Diligine Photonics Co., Ltd., Guangdong (CN)

(72) Inventors: Qiang Xue, Guangdong (CN); Quan Zhou, Guangdong (CN); Wenjie Liu, Guangdong (CN)

(73) Assignee: GUANGZHOU DILIGINE PHOTONICS CO., LTD., Guangdong (CN)

( * ) Notice: Subject to any disclaimer, the term of this patent is extended or adjusted under 35 U.S.C. 154(b) by 213 days.

(21) Appl. No.: 17/975,675

(22) Filed: Oct. 28, 2022

(65) Prior Publication Data
US 2023/0304854 A1 Sep. 28, 2023

(30) Foreign Application Priority Data
Mar. 23, 2022 (CN) .......................... 202210290751.6

(51) Int. Cl.
*G01J 1/02* (2006.01)
*G01J 1/04* (2006.01)
*G01J 1/42* (2006.01)

(52) U.S. Cl.
CPC ........... *G01J 1/0295* (2013.01); *G01J 1/0411* (2013.01); *G01J 1/4257* (2013.01)

(58) Field of Classification Search
CPC ...... G01J 1/0295; G01J 1/0411; G01J 1/4257; G01J 1/0228; G01J 1/0271; G01J 1/0414; G01J 1/08; G01J 1/0403; G01J 2001/444; G01J 2001/446; G02B 7/1825; G02B 7/14

See application file for complete search history.

(56) References Cited

U.S. PATENT DOCUMENTS

| | | | |
|---|---|---|---|
| 4,732,035 A | 3/1988 | Lagergren et al. | |
| 5,523,883 A | 6/1996 | Myers et al. | |
| 2010/0131015 A1 | 5/2010 | Kozak | |
| 2020/0141722 A1* | 5/2020 | Körner | G01B 11/2513 |
| 2023/0137623 A1* | 5/2023 | Yanase | B23K 26/032 219/121.64 |

FOREIGN PATENT DOCUMENTS

WO 2021205789 A1 10/2021

OTHER PUBLICATIONS

Extended European Search Report Aug. 1, 2023 received in European Patent Application No. 22205381.1.

* cited by examiner

*Primary Examiner* — Tarifur R Chowdhury
*Assistant Examiner* — Carlos Perez-Guzman
(74) *Attorney, Agent, or Firm* — Scully, Scott, Murphy & Presser, P.C.

(57) ABSTRACT

An optical-path calibration module is provided. The optical-path calibration module defines a first light inlet, a second light inlet, and a first light outlet, and a first light-splitting device is disposed in the optical-path calibration module. The first light inlet is configured to receive a calibration beam of a calibration light-source or be closed. The second light inlet is configured to receive a target-light-source beam or the calibration beam from the calibration light-source. The first light outlet is configured to emit a detection beam to a photoelectric sensor. An angle of 45° is defined between the first light-splitting device and each of the first light inlet and the second light inlet.

18 Claims, 10 Drawing Sheets

OPTICAL-PATH CALIBRATION MODULE

CROSS-REFERENCE TO RELATED APPLICATION

This application claims priority to and the benefit of Chinese Application Patent Application No. 202210290751.6, filed Mar. 23, 2022, the entire disclosure of which is hereby incorporated by reference.

TECHNICAL FIELD

This disclosure relates to the field of optical sensing, and particularly to an optical-path calibration module.

BACKGROUND

A photoelectric sensor for detecting the quality of laser processing generally includes a housing, a light-splitting element, a photosensitive element, etc. A working principle of the photoelectric sensor is to split incident light into at least two spectrums through built-in multiple groups of light-splitting elements, and to receive the at least two spectrums and output a photoelectric inductive signal through a photodiode corresponding to a light-splitting optical-path. However, during actual use, when the photoelectric sensor is used for a long time, accuracy of optical detection will decrease. For example, some devices such as the photodiode will be degraded due to long-term use, which will lead to "attenuation" or "distortion" of a detection signal.

There are three major causes of "attenuation" or "distortion" of a detection signal of the photoelectric sensor of an original device, which includes: 1, defects on a machined surface for manufacturing a workpiece, where "attenuation" or "distortion" of a detection signal belongs to normal attenuation in this case, and a device is not faulty; 2, failure of the photoelectric sensor, where "attenuation" or "distortion" of a detection signal belongs to belongs abnormal attenuation; 3, vibration of the device or a certain shift of a laser processing signal due to disassembly and after assembly. Determining and distinguishing a cause of signal distortion, such as determining that "attenuation" or "distortion" of a detection signal is caused by the failure of the photoelectric sensor, a problem that an existing photoelectric sensor or an auxiliary photoelectric device needs to solve.

SUMMARY

An optical-path calibration module has a multi-faceted outer sidewall enclosing to define an internal cavity. Parts of the multi-faceted outer sidewall define a first light inlet, a second light inlet, and a first light outlet respectively, and a first light-splitting device is disposed in the internal cavity. The first light inlet is configured to receive or block a calibration beam from an external light source. The second light inlet is configured to receive a target-light-source beam. The first light outlet is configured to output the target-light-source beam and/or the calibration beam. The first light-splitting device is configured to guide the calibration beam from the first light inlet to the first light outlet for output, and/or guide the target-light-source beam from the second light inlet to the first light outlet for output.

DETAILED DESCRIPTION

Technical solutions in implementations of the present disclosure will be clearly and completely described below with reference to the accompanying drawings in implementations of the present disclosure. Obviously, implementations described herein are only a part of rather than all of implementations of the present disclosure. Based on implementations of the present disclosure, all other implementations obtained by those skilled in the art without creative efforts shall fall within the protection scope of the present disclosure.

Terms used in implementations of the present application are only for the purpose of describing specific implementations, and are not intended to limit the present disclosure. Singular forms "a" and "the" used in implementations of the present disclosure and appended claims are intended to include plural forms as well, unless otherwise defined clearly in the context. It should be understood that the term "and/or" used in the disclosure only describes an association relationship among associated objects, indicating that there may exist three kinds of relationships, for example, A and/or B may indicate that A exists alone, A and B exist at the same time, and B exists alone. In addition, the character "/" in this disclosure generally indicates that associated objects after and before "/" have a relationship of "or". It should be understood that the terms "first", "second" and similar words used in implementations of the present disclosure are intended to distinguish different components rather than indicating any order, quantity, or priority. Likewise, "a" or "an" or the like is not intended to limit quantity, but rather indicate that at least one exists. The "multiple" or "plurality of" involved in implementations of the present disclosure refers to equal to or greater than two.

In use of photoelectric sensors, in order to determine a cause of distortion of a signal received by the photoelectric sensor, such as determining whether "attenuation" or "distortion" of a detection signal is caused by failure of the photoelectric sensor itself, or a variation of an external signal received by the photoelectric sensor, an optical-path calibration module is introduced in the present disclosure to determine or assist the photoelectric sensor to determine the cause of signal distortion.

Figure 1:
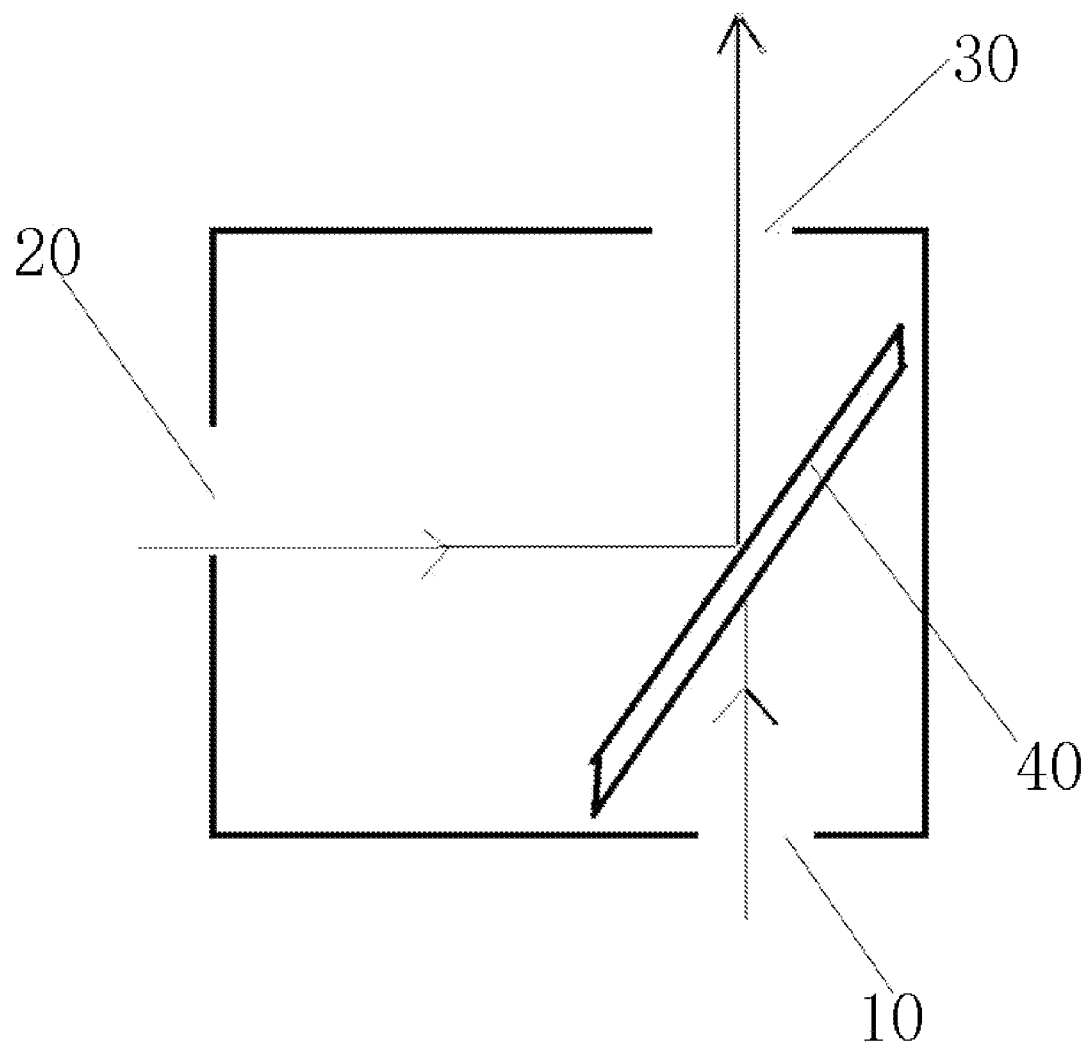
FIG. 1 is schematic structural view of an optical-path calibration module provided in implementations of the present disclosure.

As illustrated in FIG. 1, an optical-path calibration module 1 is provided in the present disclosure, the optical-path calibration module has a multi-faceted outer sidewall enclosing to define an internal cavity. Parts of the multi-faceted outer sidewall define a first light inlet 10, a second light inlet 20, and a first light outlet 30 respectively, and a first light-splitting device 40 is disposed in the internal cavity. The first light inlet 10 is configured to receive or block a calibration beam from an external light source. The second light inlet 20 is configured to receive a target-light-source beam. The first light outlet 30 is configured to output the target-light-source beam and/or the calibration beam. The first light-splitting device 40 is configured to guide the calibration beam from the first light inlet 10 to the first light outlet 30 for output, and/or guide the target-light-source beam from the second light inlet 20 to the first light outlet 30 for output. In implementations of the present disclosure, in the optical-path calibration module 1, the first light inlet 10 configured to receive the calibration beam from the external light source, the second light inlet 20 configured to receive the target-light-source beam, and the first light-splitting device configured to guide the target-light-source beam and/or the calibration beam to be output from the first light outlet 30 and to enter a target photoelectric sensor are introduced, thereby determining whether "attenuation" or "distortion" of a detection signal of a photoelectric sensor of an original device is caused by the damage of the photoelectric sensor. In an application scenario, the target-light-source beam may be laser processing light from an external laser head or reflected light of the laser processing light radiated by an external laser processing working surface. The calibration beam may be from a narrow-band spectral light source with the same spectral band as the target-light-source beam, or from a broadband spectral light source that covers a spectral band of the target-light-source beam.

Furthermore, the first light-splitting device 40 is a neutral beam splitter, and the first light-splitting device 40 is configured to reflect the target-light-source beam from the second light inlet 20 to the first light outlet 30 and is further configured to transmit the calibration beam from the first light inlet 10 to the first light outlet 30, where a radiation frequency width of the calibration beam covers a frequency of the target-light-source beam. The calibration beam may from a monochromatic light-source or from a broadband light source. By using the monochromatic light-source, an influence of ambient light on a calibration result can be avoided. By using the broadband light source, for example, when a radiation frequency width of the calibration beam covers a frequency of the target-light-source beam, an emission environment of the target-light-source beam can be more accurately fitted. It should be understood that when the first light-splitting device 40 is the neutral beam splitter, the second light inlet 20 can be temporarily closed to avoid the influence of the target-light-source beam on the calibration beam. It can be understood that when the first light-splitting device 40 is a dichroscope or a dichroic mirror, the second light inlet 20 can be opened all the time. The dichroscope is configured to completely reflect the target-light-source beam from the second light inlet 20 to the first light outlet 30 and almost completely transmit the calibration beam from the first light inlet 10. In this case, the target-light-source beam may be different from the calibration beam in wavelength. In other words, the target-light-source beam and the calibration beam have different radiation frequencies respectively.

Figure 2:
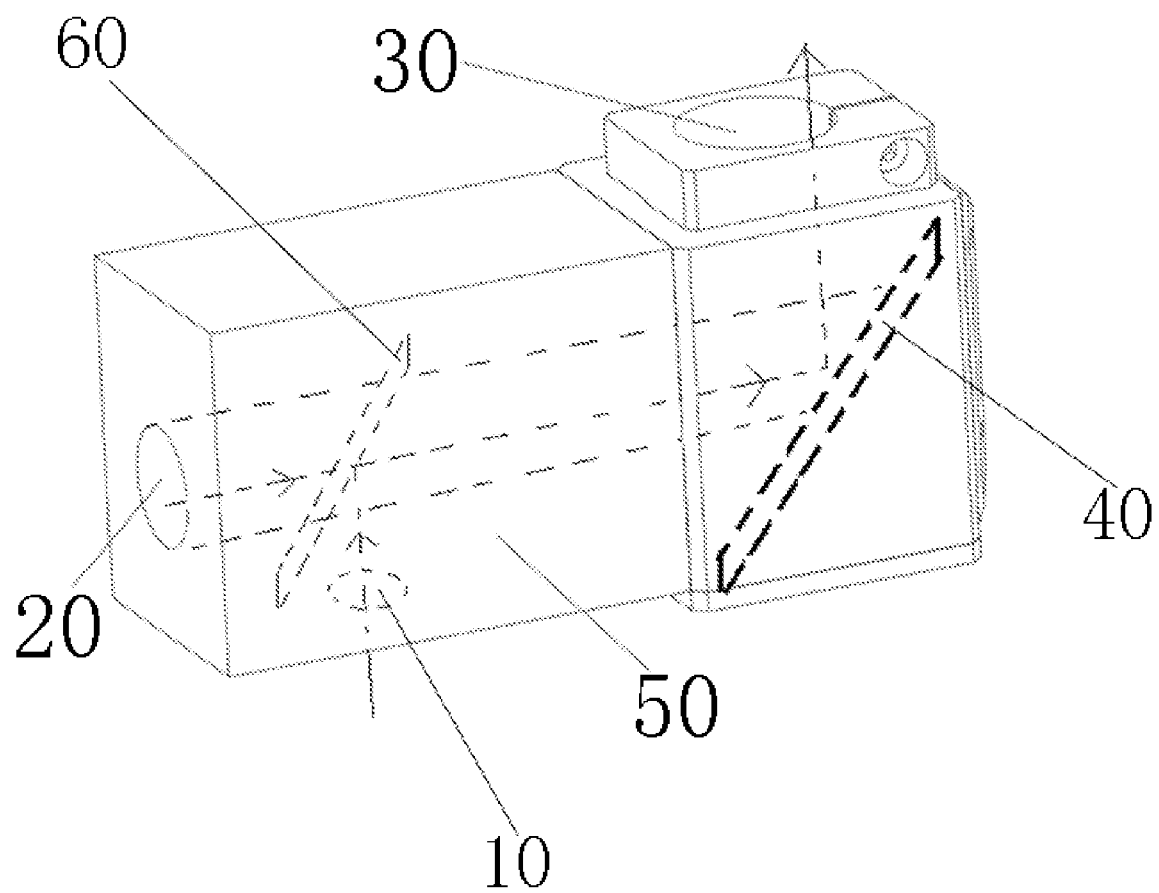
FIG. 2 is a schematic assembly view of the optical-path calibration module provided in other implementations of the present disclosure.

Furthermore, reference is made to FIG. 2, the optical-path calibration module 1 provided in the disclosure further includes a T-shaped cavity structure 50 and a second light-splitting device 60. The T-shaped cavity structure 50 has a left cavity as the second light inlet 20, a lower cavity as the first light inlet 10, and a right cavity extending to the first light-splitting device 40 in the optical-path calibration module 1 to make a beam in the right cavity be reflected to the first light outlet 30 by the first light-splitting device 40. The second light-splitting device 60 is a neutral beam splitter, the second light-splitting device 60 is configured to transmit the target-light-source beam from the second light inlet 20 to the first light-splitting device 40 and further configured to reflect the calibration beam from the first light inlet 10 to the first light-splitting device 40. It should be understood that by means of the T-shaped cavity structure 50 and the second light-splitting device 60, the target-light-source beam entering the second light inlet 20 and the calibration beam entering the first light inlet 10 enter in the same direction relative to the first light-splitting device 40, which is convenient for production-and-assembly or test on application on production lines and effectively improves production efficiency. In the T-shaped cavity structure 50 of the optical-path calibration module 1, the second light-splitting device 60 is a total-reflection lens and detachably disposed in the T-shaped cavity structure 50. When the total-reflection lens is used to guide a light beam, the total-reflection lens blocks the interference of the target-light-source beam and external stray light with the left side of the total-reflection lens and reflects the calibration beam from the calibration light-source to the first light-splitting device 40 with the right side of the total-reflection lens, which maximizes an output power of the calibration beam and detection effectiveness of the calibration beam.

In some implementations, as illustrated in FIGS. 1 and 4-10, an optical-path calibration module 1 defines a first light inlet 10, a second light inlet 20, and a first light outlet 30. A first light-splitting device 40 is disposed in the optical-path calibration module 1.

The first light inlet 10 is configured to receive a calibration beam from a calibration light-source first. When calibration is completed, the calibration light-source is removed, and the first light inlet 10 is closed to prevent external stray light from entering a photoelectric sensor through the optical-path calibration module 1. The second light inlet 20 is configured to receive a target-light-source beam. The first light outlet 30 is configured to emit a detection beam to the photoelectric sensor. An angle of 45° is defined between the first light-splitting device 40 and each of the first light inlet 10 and the second light inlet 20.

In this implementation, the first light-splitting device 40 is a light-splitting device with a split ratio of 5:5, and the calibration light-source is installed at the first light inlet 10 of the optical-path calibration module 1. The calibration beam emitted by the calibration light-source enters the optical-path calibration module 1 and is reflected and transmitted by the first light-splitting device 40. The calibration beam transmitted outputted from the first light outlet 30 is received by the photoelectric sensor, the calibration beam received is split into at least two spectrums through a light-splitting optical-path inside the photoelectric sensor, and then the at least two spectrums are received by a photosensitive PD (generally a photodiode) corresponding to light-splitting optical-path. A photoelectric inductive signal is outputted by the photosensitive PD and marked. A signal marked by the calibration light-source is compared with a photoelectric inductive signal output by the target-light-source beam in actual manufacture to determine whether the photoelectric sensor itself is damaged.

Usually, an optical path in the photoelectric sensor is split into multiple optical paths by a light-splitting element. Therefore, the optical-path calibration module 1 of the present disclosure can determine consistency of photoelectric inductive signals at one time before and after the multiple optical paths in the photoelectric sensor are used, so as to adjust the optical paths.

When the consistency is determined to meet requirements, the calibration light-source can be removed, and the first light inlet 10 is closed to prevent external light from entering and affecting a detection result of the photoelectric sensor.

When the first light-splitting device 40 is a neutral beam splitter, the first light-splitting device 40 is configured to reflect the target-light-source beam from the second light inlet 20 to the first light outlet 30 and transmit the calibration beam from the first light inlet 10 to the first light outlet 30. The calibration beam may from a monochromatic light-source or from a broadband light source. By using the monochromatic light-source, an influence of ambient light on a calibration result can be avoided. By using the broadband light source, for example, when a radiation frequency width of the calibration beam covers a frequency of the target-light-source beam, an emission environment of the target-light-source beam can be more accurately fitted.

When the first light-splitting device 40 is a dichroscope or a dichroic mirror, the first light-splitting device 40 is configured to completely reflect the target-light-source beam from the second light inlet 20 to the first light outlet 30 and completely transmit the calibration beam from the first light inlet 10 to the first light outlet 30, where the target-light-source beam and the calibration beam have different radiation frequencies respectively.

In other implementation, a T-shaped cavity structure 50 and a second light-splitting device 60 can be further provided. Specifically, as illustrated in FIGS. 2-10, the optical-path calibration module 1 defines a first light inlet 10, a second light inlet 20, a first light outlet 30, and a T-shaped cavity structure 50. The first light-splitting device 40 and the second light-splitting device 60 are disposed in the optical-path calibration module 1. In this case, the T-shaped cavity structure 50 is defined within the right side of the optical-path calibration module 1, and T-shaped cavity structure 50 has a right cavity extending the second light inlet 20 to the first light-splitting device 40. The T-shaped cavity structure 50 has a left cavity as the second light inlet 20, a lower cavity as the first light inlet 10, and a right cavity extending to the first light-splitting device 40 to make a beam in the right cavity be reflected to the first light outlet 30 by the first light-splitting device 40. The second light-splitting device 60 is a neutral beam splitter or a total-reflection lens, the second light-splitting device 60 is configured to transmit the target-light-source beam from the second light inlet 20 to the first light-splitting device 40 and further configured to reflect the calibration beam from the first light inlet 10 to the first light-splitting device 40. In this implementation, a neutral beam splitter with a split ratio of 5:5 can be selected as the second light-splitting device 60.

The first light inlet 10 in this implementation first receives the calibration beam from the calibration light-source. When calibration is completed, the calibration light-source is removed, and the first light inlet 10 is closed to prevent external stray light from entering the photoelectric sensor through the calibration module 1.

The second light inlet 20 is configured to receive the target-light-source beam. The first light outlet 30 is configured to emit a detection beam to the photoelectric sensor. The second light-splitting device 60 is inserted and installed at a corner inside the T-shaped cavity structure 50 through the first light inlet 10, and an angle of 45° is defined between the second light-splitting device 60 and each of the first light inlet 10 and the second light inlet 20.

The first light-splitting device 40 is parallel to the second light-splitting device 60, which ensures collimation of the calibration beam reflected by the second light-splitting device 60 and maximization of the output power of the calibration beam incident into the photoelectric sensor.

In this implementation, the calibration light-source is installed at the first light inlet 10 of the T-shaped cavity structure 50, and the calibration beam emitted by the calibration light-source enters the T-shaped cavity structure 50, and is reflected by the second light-splitting device 60 installed at the corner inside the T-shaped cavity structure 50. At the same time, the target light source is installed at the second light inlet 20, both transmitted light of the target light-source-beam and reflected light of the calibration beam are reflected by the first light-splitting device 40 to be emitted out from the first light outlet 30 and then received by the photoelectric sensor, so as to determine whether the photoelectric sensor itself is damaged according to the same method as described above.

When the consistency is determined to meet requirements, the calibration light-source can be removed, the T-shaped cavity structure 50 is also removed, and the target-light-source beam is incident into the optical-path calibration module 1 through the second light inlet 20.

In some implementations, the second light-splitting device 60 may be a total-reflection lens 60, and the total-reflection lens 60 is inserted and installed at a corner inside the T-shaped cavity structure 50 through the first light inlet 10. An angle of 45° is defined between the total-reflection lens 60 and each of the first light inlet 10 and the second light inlet 20. On one hand, the calibration beam from the first light inlet 10 is completely reflected by the total-reflection lens 60 to be reflected by the first light-splitting device 40. The reflected calibration beam is emitted out from the first light outlet 30 and received by the photoelectric sensor, which ensures maximization of the output power of the calibration beam. On the other hand, when the target-light-source beam enters the T-shaped cavity structure 50 through the second light inlet 20, the total-reflection lens 60 completely reflects the target-light-source beam upward, thereby eliminating the interference of the target light source and external stray light.

Figure 3:
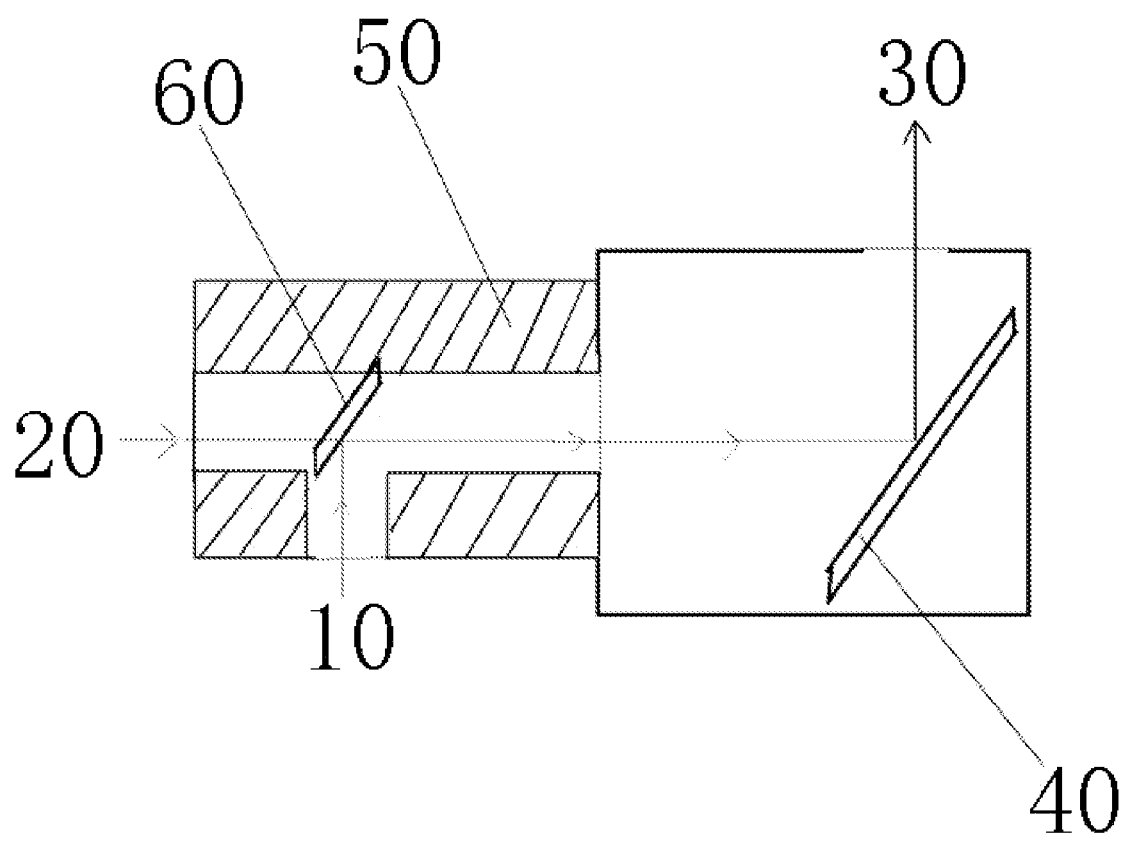
FIG. 3 is a cross-sectional view of the optical-path calibration module in FIG. 2.
Figure 4:
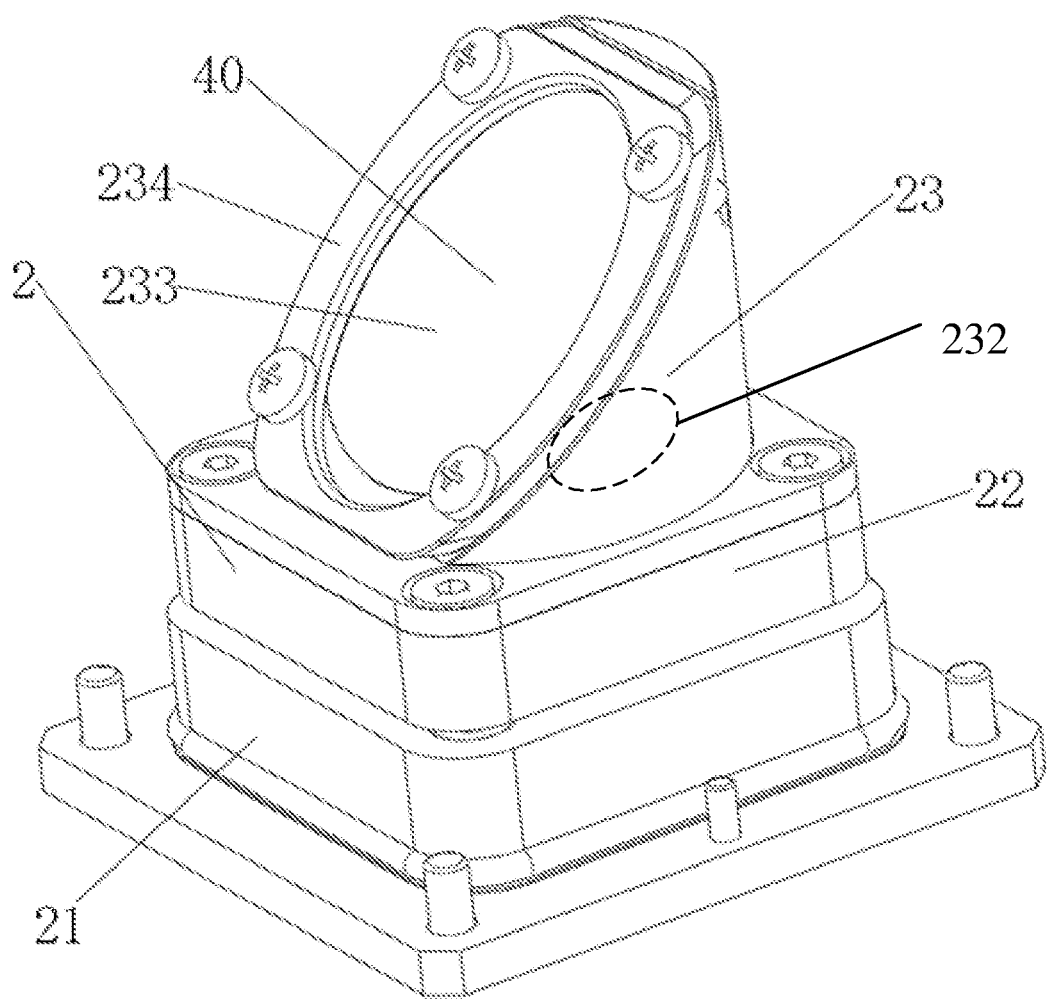
FIG. 4 is a perspective view of an adjustable mirror mount of an optical-path calibration module.
Figure 5:
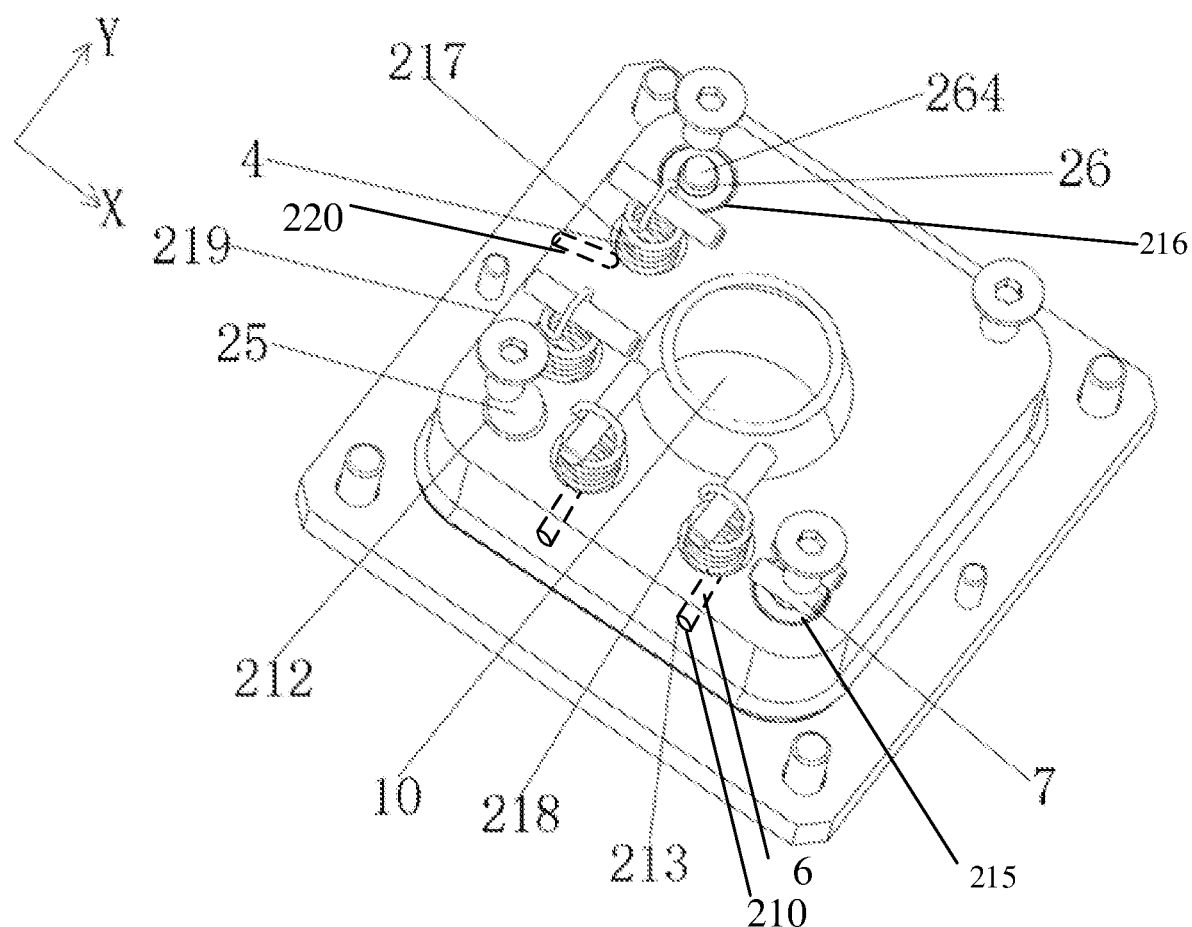
FIG. 5 is a perspective view of a base of an adjustable mirror mount.
Figure 6:
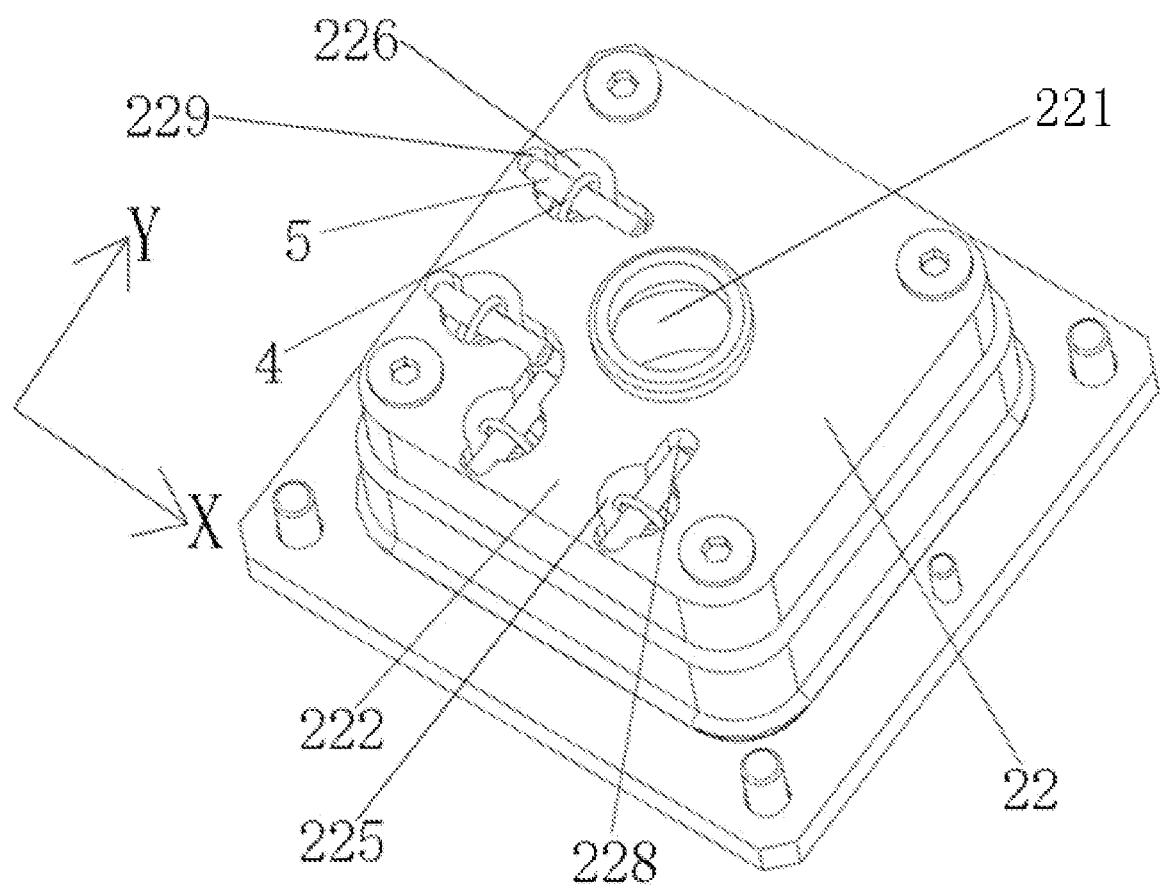
FIG. 6 is a front view of a cover plate of an adjustable mirror mount.
Figure 7:
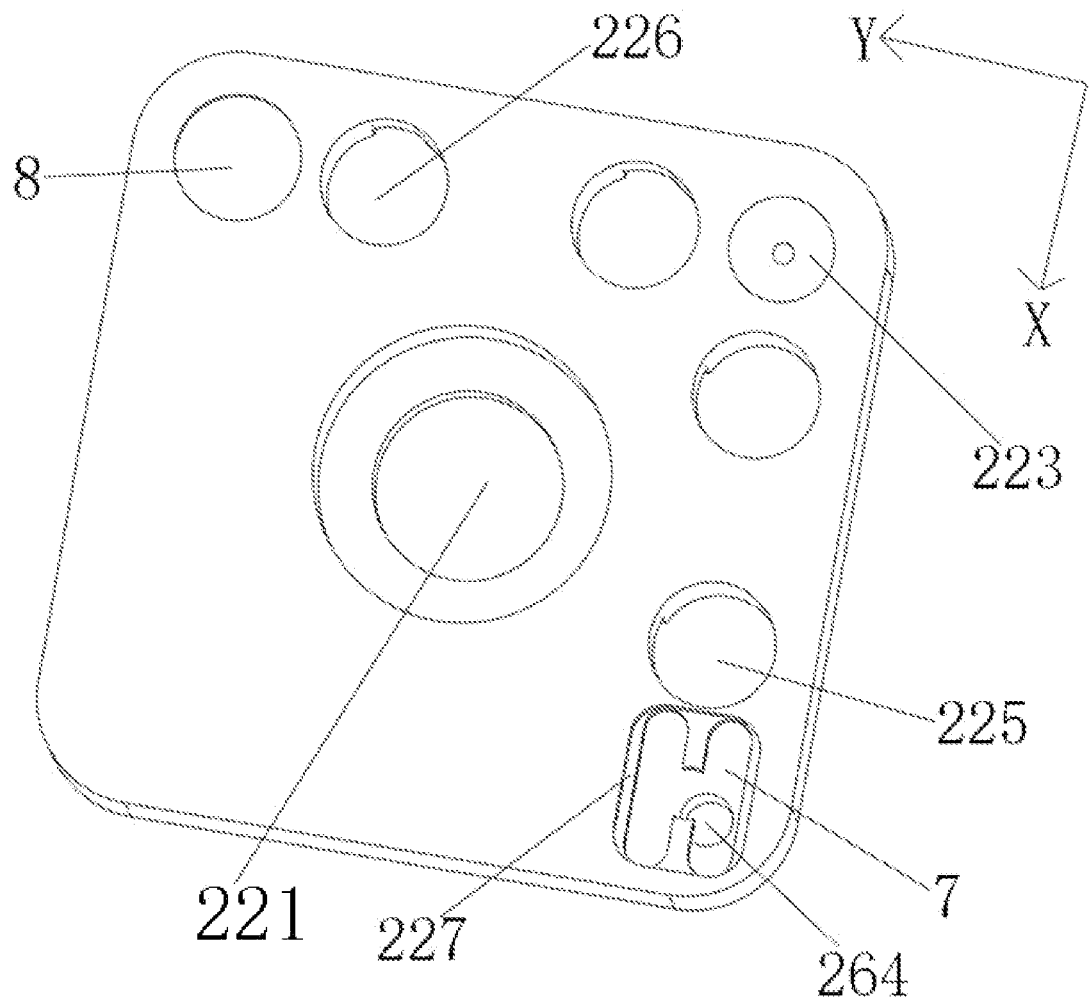
FIG. 7 is a rear view of a cover plate of an adjustable mirror mount.
Figure 8:
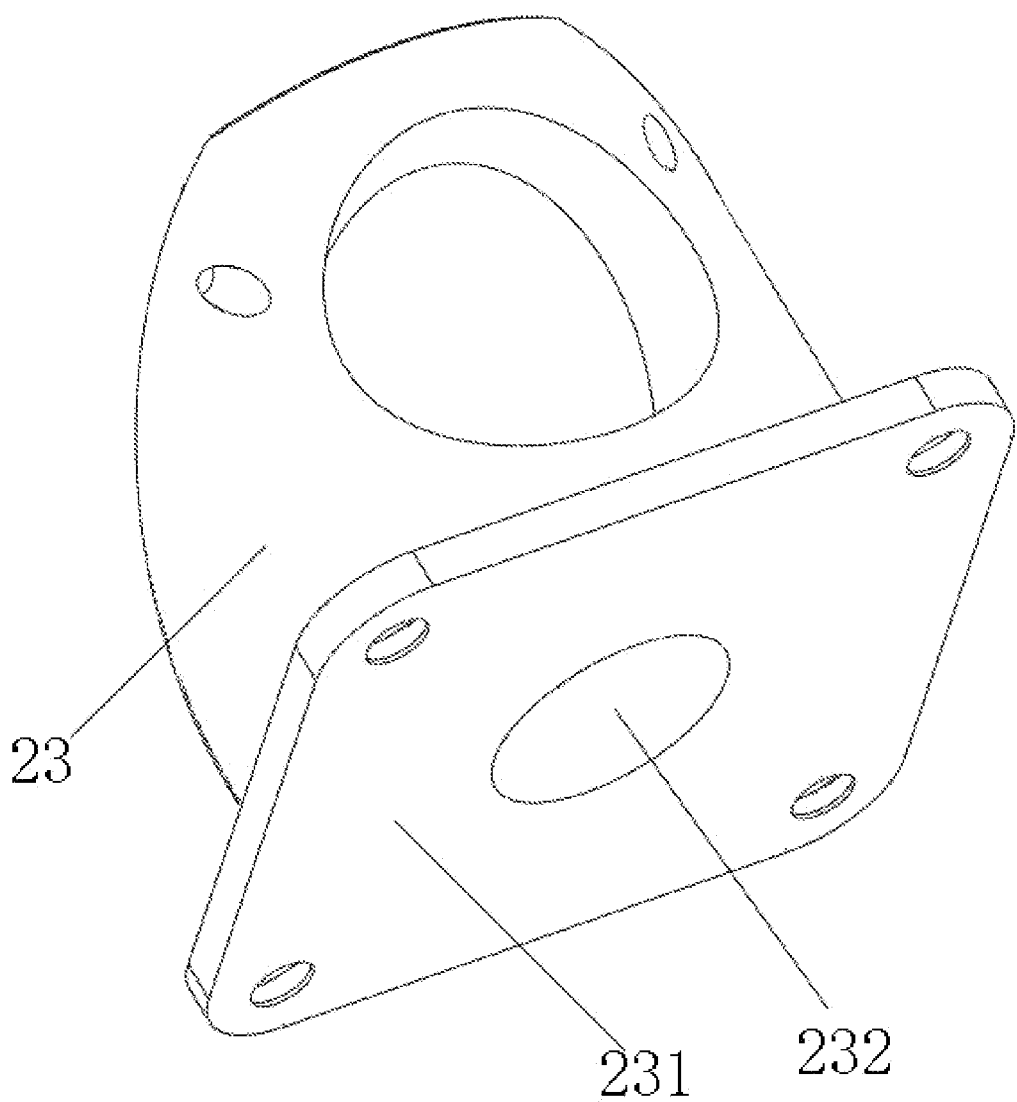
FIG. 8 is a perspective view of a light-splitting-device bracket.
Figure 9:
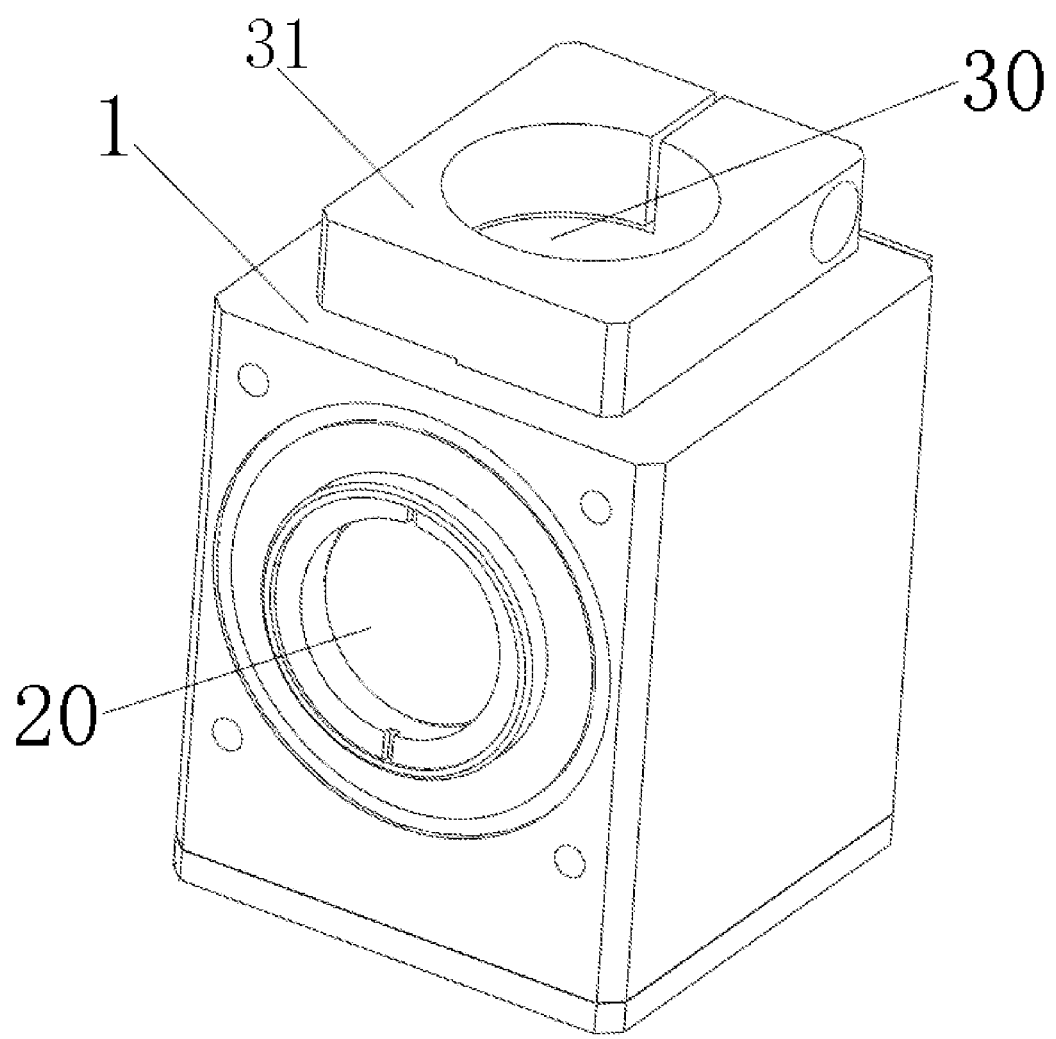
FIG. 9 is a perspective view of an outer sidewall of an optical-path calibration module provided in implementations of the present disclosure.
Figure 10:
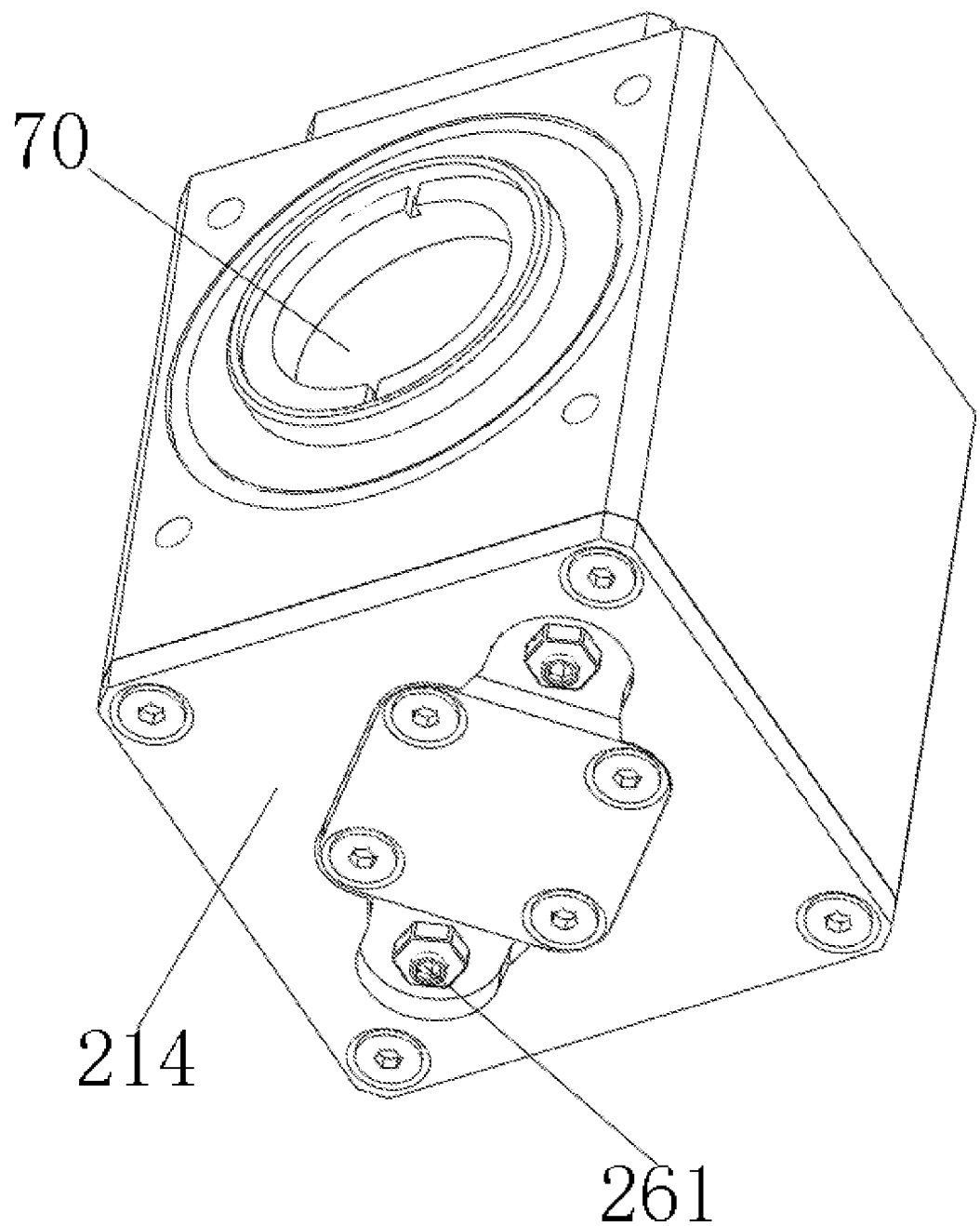
FIG. 10 is a perspective view of an outer sidewall of an optical-path calibration module provided in other implementations of the present disclosure.

As illustrated in FIGS. 4-10, the optical-path calibration module as illustrated in FIGS. 1-3 can be further provided with an adjustable mirror mount 2. The adjustable mirror mount 2 includes a light-splitting-device bracket 23, a base 21 for fixing the light-splitting-device bracket 23, a cover plate 22 elastically connected with the base 21, a movable rotating shaft 25, and a threaded pair 26. The adjustable mirror mount 2 is disposed in the internal cavity. The adjustable mirror mount 2 is mainly for adjusting an angle of the first light-splitting device 40 on the adjustable mirror mount 2 through fine adjustment, so as to ensure the angle between the first light-splitting device 40 and each of the first light inlet 10 and the second light inlet 20, collimation of a beam reflected by the first light-splitting device 40, and maximization of the output power of the calibration beam incident into the photoelectric sensor.

The light-splitting-device bracket 23 has a side surface 233 and a bottom surface 231, the side surface 233 of the light-splitting-device bracket 23 is a hollow inclined surface, the first light-splitting device 40 is fixed to the hollow inclined surface 233 by a pressing piece 234, the bottom surface 231 of the light-splitting-device bracket is fixed to the cover plate 22, and the bottom surface 231 of the light-splitting-device bracket defines a light transmission-hole 232.

The cover plate 22 defines a light through-hole 221 at a center of the cover plate 22, the cover plate 22 is elastically connected with the base 21 at the bottom of the cover plate, and the movable rotating shaft 25 and the threaded pair 26 are elastically disposed between the cover plate 22 and the base 21.

In this implementation, the optical-path calibration module 1 is a cuboid, the adjustment mirror mount 2 is installed inside the cuboid, and the bottom surface 21 of the adjustment mirror mount 2 is a bottom surface of the cuboid, so the light transmission-hole on the bottom surface 21 is the first light inlet 10. The first light inlet 10, the light through-hole 221 of the cover plate 22, and the hollow inclined surface 233 of the light-splitting-device bracket 23 are interconnected.

A recess defined between the base 21 and the cover plate 22 is configured to clamp the movable rotating shaft 25, and a through-hole defined at a side of the recess is configured to receive the threaded pair 26. The threaded pair 26 extends through the through-hole to abut against the cover plate 22 at a top end of the threaded pair 26, and to be fixed with a lower surface 214 of the base 21 at a lower end of the threaded pair 26 through a cap for the threaded pair 26, and the cap 261 for the threaded pair 26 beyond the lower surface 214 of the base 21 is rotatable to adjust a distance between the base 21 and the cover plate 22.

In this implementation, the recess includes a first recess 21 disposed on the base 21 and a second recess 223 disposed on the cover plate 22, the first recess 212 is located at an intersection of an X axis and a Y axis of the base 21, the second recess is located at an intersection of an X axis and a Y axis of the cover plate 22. For example, the movable rotating shaft 25 is a supporting ball, the supporting ball is sandwiched by the first recess 212 and the second recess 223. There are two through-holes, which are respectively defined on the X axis and the Y axis of the top surface 211 of the base 21. A first through-hole 215 is defined on the X axis of the top surface 211 of the base 21, and a second through-hole 216 is defined on the Y axis of the top surface 211 of the base 21. Threaded pairs 26 configured to adjust the angle of the first light-splitting device 40 are received in the first through-hole 215 and the second through-hole 216. Therefore, the supporting ball 25 and the threaded pairs 26 corresponding to the first through-hole 215 and the second through-hole 216 define a triangular plane. When two threaded pairs 26 are adjusted to rise and fall, the cover plate 22 rises and falls along the X-axis or Y-axis of the cover plate 22 with the supporting ball 25 as a fulcrum, thereby realizing inclination of the top surface 222 of the cover plate 22 so as to lead to fine adjustment of the angle of the first light-splitting device 40.

In this implementation, the cover plate 22 is elastically connected to the base 21 at the bottom of the cover plate 22, thereby adjusting an inclination angle of the cover plate 22 relative to the base 21 more accurately. The cover plate 22 is elastically connected to the base 21 as follows.

The base defines at least one first blind-hole 218 on the top surface 211 of the base 21 on the X axis and at least one second blind-hole 210 at a side surface of the X axis, and the at least one second blind-hole extends to the at least one first blind-hole 218. The base defines at least one third blind-hole 217 on the top surface 211 of the base on the Y axis and at least one fourth blind-hole 220 at a side surface 219 of the Y axis, and the at least one fourth blind-hole extends to the at least one third blind-hole. Springs 4 are received in the at least one first blind-hole 218 and at least one third blind-hole 217 respectively, lower spring-anchor-posts 6 are inserted into the at least one second blind-hole and the at least one fourth blind-hole respectively, and the springs 4 each have a lower end hooking a corresponding lower spring-anchor-post.

The cover plate defines at least one fifth through-hole 225 corresponding to the at least one first blind-hole 218 on the X axis of a top surface 222 of the cover plate 22 and at least one sixth through-hole 226 corresponding to the at least one third blind-hole 217 on the Y axis of the top surface 222 of the cover plate 22. The cover plate defines a first groove 228 and a second groove 229 on the top surface 222 of the cover plate 22, the first groove 228 extends to the fifth through-hole 225 and the second groove 229 extends to the sixth through-hole 226. Upper spring-anchor-posts 5 are respectively received in the first groove 228 and the second groove 229, each of the springs 4 has an upper end hooking an upper spring-anchor-post 5, and thus the base 21 and the cover plate 22 are elastically connected.

In some implementations, the threaded pair 26 defines an inward spherical recess at a top end of the threaded pair 26, and a ball 264 is received in the spherical recess. The cover plate defines a third groove 227 corresponding to the threaded pair 26 at a lower surface of the cover plate 22, and the third groove 227 has two parallel guide struts 7 which are embedded along the X axis direction of the cover plate 22 and for the ball 264 to slide. The cover plate 22 further defines a circular groove 8 which is on the Y axis of the cover plate 22 and rotatable with the ball 264 as a fulcrum. The parallel guide struts 7 and the circular groove 8 are mainly to ensure that when the thread pair 26 adjusts the cover plate 22 to rise and fall along the X axis, the cover plate 22 will not be shifted along the X axis and the Y axis. In can be understood that the two parallel guide struts 7 are disposed on the X axis or the Y axis, and the circular groove 8 can be disposed similarly.

In some implementations, the optical-path calibration module 1 may further define a second light outlet 70 at the outer side-wall for installing a camera, which is convenient for a user to install the camera. The first light outlet 30 can further protrude upwards with a locking ring 31 which is convenient for tightening and loosening of the photoelectric sensor.

Compared with the related art, the present disclosure has following beneficial effects.

(1) In this disclosure, in the optical-path calibration module, a first light inlet configured to receive a calibration beam from an external light source, a second light inlet configured to receive a target-light-source beam, and a first light-splitting device configured to guide the target-light-source beam and/or the calibration beam to be output from the first light outlet and to enter a target photoelectric sensor are introduced, so as to determine whether "attenuation" or "distortion" of a detection signal of a photoelectric sensor of an original device is caused by the damage of the photoelectric sensor.

(2) By means of a light-splitting-device bracket, a base, a cover plate, and a movable rotating shaft and a threaded pair sandwiched between the base and the cover plate, an inclination angle of the first light-splitting device can be adjusted, and a calibration function of an internal optical-path can be conveniently realized.

(3) According to different production-line environment, the calibration module can also include a T-shaped cavity structure and a second light-splitting device, so that the target-light-source beam and the calibration beam from light inlets enter in the same direction, the calibration beam is reflected by the second light-splitting device to be guided to the first light-splitting device, which is convenient for production-and-assembly or test on application on production lines and effectively improves production efficiency.

(4) The second light-splitting device is detachably disposed in the T-shaped cavity structure of the calibration module, and when a total-reflection lens is used to guide a light beam, the total-reflection lens blocks the interference of the target-light-source beam and external stray light with the left side of the total-reflection lens and reflects the calibration beam from the calibration light-source to the first light-splitting device with the right side of the total-reflection lens, which maximizes an output power of the calibration beam.

The above are implementations of the present invention. It should be noted that for those skilled in the art, without departing from the principles of the present disclosure, several improvements and modifications can be made, and these improvements and modifications may also be regarded to fall within the protection scope of the present disclosure.

What is claimed is:

1. An optical-path calibration module having a multi-faceted outer sidewall enclosing to define an internal cavity, wherein parts of the multi-faceted outer sidewall define a first light inlet, a second light inlet, and a first light outlet respectively, and a first light-splitting device is disposed in the internal cavity; wherein,
the first light inlet is configured to receive or block a calibration beam from an external light source;
the second light inlet is configured to receive a target-light-source beam;
the first light outlet is configured to output the target-light-source beam and/or the calibration beam; and
the first light-splitting device is configured to guide the calibration beam from the first light inlet to the first light outlet for output, and/or guide the target-light-source beam from the second light inlet to the first light outlet for output;
wherein the optical-path calibration module further comprises an adjustable mirror mount, wherein,
the adjustable mirror mount comprises a light-splitting-device bracket, a base for fixing the light-splitting-device bracket, a cover plate elastically connected with the base, a movable rotating shaft, and a threaded pair, and the adjustable mirror mount is disposed in the internal cavity;
the light-splitting-device bracket has a side surface and a bottom surface, the side surface of the light-splitting-device bracket is a hollow inclined surface, the first light-splitting device is fixed to the hollow inclined surface by a pressing piece, the bottom surface of the light-splitting-device bracket is fixed to the cover plate, and the bottom surface of the light-splitting-device bracket defines a light transmission-hole;
the cover plate defines a light through-hole at a center of the cover plate, the cover plate is elastically connected with the base at the bottom of the cover plate, and the movable rotating shaft and the threaded pair are elastically disposed between the cover plate and the base;
the base defines the first light inlet for light to pass through at a center of the base, and the first light inlet, the light through-hole of the cover plate, and the light transmission-hole of the light-splitting-device bracket are interconnected;
a recess defined between the base and the cover plate is configured to clamp the movable rotating shaft, and a through-hole defined at a side of the recess is configured to receive the threaded pair; and
the threaded pair extends through the through-hole to abut against the cover plate at a top end of the threaded pair, and to be fixed with a lower surface of the base at a lower end of the threaded pair through a cap for the threaded pair, and the cap for the threaded pair beyond the lower surface of the base is rotatable to adjust a distance between the base and the cover plate.

2. The optical-path calibration module of claim 1, wherein the first light-splitting device is a neutral beam splitter, the first light-splitting device is configured to reflect the target-light-source beam from the second light inlet to the first light outlet and is further configured to transmit the calibration beam from the first light inlet to the first light outlet, wherein a radiation frequency width of the calibration beam covers a frequency of the target-light-source beam.

3. The optical-path calibration module of claim 1, further comprising:
a T-shaped cavity structure and a second light-splitting device;
wherein the T-shaped cavity structure has a left cavity as the second light inlet, a lower cavity as the first light inlet, and a right cavity extending to the first light-splitting device to make a beam in the right cavity be reflected to the first light outlet by the first light-splitting device.

4. The optical-path calibration module of claim 3, wherein the second light-splitting device is a neutral beam splitter, the second light-splitting device is configured to transmit the target-light-source beam from the second light inlet to the first light-splitting device and further configured to reflect the calibration beam from the first light inlet to the first light-splitting device.

5. The optical-path calibration module of claim 3, wherein the second light-splitting device is a total-reflection optical lens, and the second light-splitting device is detachably inserted into the optical-path calibration module through the lower cavity which serves as the first light inlet, to reflect the calibration beam from the first light inlet to the first light-splitting device; and the second light-splitting device is configure to block the target-light-source beam from entering the optical-path calibration module through the second light inlet.

6. The optical-path calibration module of claim 1, wherein the base defines a first through-hole on one side and defines a second through-hole on another side of the center of the base, and threaded pairs are disposed in each of the first through-hole and the second through-hole; the movable rotating shaft and the threaded pairs corresponding to the first through-hole and the second through-hole define a triangular plane, and a cap for any of the threaded pairs is rotatable with the movable rotating shaft as a fulcrum to adjust an inclination angle of the cover plate relative to the base.

7. The optical-path calibration module of claim 1, wherein the recess between the base and the cover plate comprises a first recess and a second recess, the first recess is located at an intersection of an X axis and a Y axis of the base, the second recess is located at an intersection of an X axis and a Y axis of the cover plate, and the movable rotating shaft is a supporting ball sandwiched by the first recess and the second recess.

8. The optical-path calibration module of claim 7, wherein the base defines at least one first blind-hole on a top surface of the base on the X axis and at least one second blind-hole at a side surface of the X axis, and the at least one second blind-hole extends to the at least one first blind-hole; the base defines at least one third blind-hole on the top surface of the base on the Y axis and at least one fourth blind-hole at a side surface of the Y axis, and the at least one fourth blind-hole extends to the at least one third blind-hole; and springs are received in the at least one first blind-hole and at least one third blind-hole respectively, lower spring-anchor-posts are inserted into the at least one second blind-hole and the at least one fourth blind-hole respectively, and the springs each have a lower end hooking a corresponding lower spring-anchor-post.

9. The optical-path calibration module of claim 7, wherein the cover plate defines at least one fifth through-hole corresponding to the at least one first blind-hole on the X axis of the cover plate and at least one sixth through-hole corresponding to the at least one third blind-hole on the Y axis of the cover plate, the cover plate defines at least one first groove and at least one second groove on a top surface of the cover plate, the at least one first groove extends to the at least one fifth through-hole respectively and the at least one second groove extends to the at least one sixth through-hole respectively; upper spring-anchor-posts are respectively received in the at least one first groove and the respectively second groove, each of the springs has an upper end hooking an upper spring-anchor-post.

10. The optical-path calibration module of claim 7, wherein the threaded pair defines an inward spherical recess at a top end of the threaded pair, and a ball is received in the spherical recess; and the cover plate defines a third groove corresponding to the threaded pair at a lower surface of the cover plate, and the third groove has two parallel guide struts which are embedded along an X axis direction of the cover plate and for the ball to slide.

11. The optical-path calibration module of claim 10, wherein the cover plate further defines a circular groove which is on the Y axis of the cover plate and rotatable with the ball as a fulcrum.

12. The optical-path calibration module of claim 2, wherein the first light-splitting device is a light-splitting device with a split ratio of 5:5, and an angle of 45° is defined between the first light-splitting device and each of the first light inlet and the second light inlet.

13. The optical-path calibration module of claim 4, the second light-splitting device is a light-splitting device with a split ratio of 5:5 and disposed at a corner of the T-shaped cavity structure, and an angle of 45° is defined between the second light-splitting device and the second light inlet.

14. An optical-path calibration module comprising:
a multi-faceted outer sidewall enclosing to define an internal cavity, wherein the multi-faceted outer sidewall defines a first light outlet;
a T-shaped cavity structure having a lower cavity as a first light inlet and a left cavity as a second light inlet, wherein the first light inlet is configured to receive or block a calibration beam from an external light source, and the second light inlet is configured to receive a target-light-source beam, and the first light outlet is configured to output the target-light-source beam and/or the calibration beam; and
a first light-splitting device disposed in the internal cavity and configured to guide the calibration beam from the first light inlet to the first light outlet for output, and/or guide the target-light-source beam from the second light inlet to the first light outlet for output, wherein the T-shaped cavity structure further has a right cavity extending to the first light-splitting device to make a beam in the right cavity be reflected to the first light outlet by the first light-splitting device; and
a second light-splitting device configured to transmit the target-light-source beam from the second light inlet to the first light-splitting device and further configured to reflect the calibration beam from the first light inlet to the first light-splitting device;
wherein the optical-path calibration module further comprises an adjustable mirror mount, wherein,
the adjustable mirror mount comprises a light-splitting-device bracket, a base for fixing the light-splitting-device bracket, a cover plate elastically connected with the base, a movable rotating shaft, and a threaded pair, and the adjustable mirror mount is disposed in the internal cavity;
the light-splitting-device bracket has a side surface and a bottom surface, the side surface of the light-splitting-device bracket is a hollow inclined surface, the first light-splitting device is fixed to the hollow inclined surface by a pressing piece, the bottom surface of the light-splitting-device bracket is fixed to the cover plate, and the bottom surface of the light-splitting-device bracket defines a light transmission-hole;
the cover plate defines a light through-hole at a center of the cover plate, the cover plate is elastically connected with the base at the bottom of the cover plate, and the movable rotating shaft and the threaded pair are elastically disposed between the cover plate and the base;
the base defines the first light inlet for light to pass through at a center of the base, and the first light inlet, the light through-hole of the cover plate, and the light transmission-hole of the light-splitting-device bracket are interconnected;
a recess defined between the base and the cover plate is configured to clamp the movable rotating shaft, and a through-hole defined at a side of the recess is configured to receive the threaded pair; and
the threaded pair extends through the through-hole to abut against the cover plate at a top end of the threaded pair, and to be fixed with a lower surface of the base at a lower end of the threaded pair through a cap for the threaded pair, and the cap for the threaded pair beyond the lower surface of the base is rotatable to adjust a distance between the base and the cover plate.

15. The optical-path calibration module of claim 14, wherein the first light-splitting device is a neutral beam splitter, the first light-splitting device is configured to reflect the target-light-source beam from the second light inlet to the first light outlet and is further configured to transmit the calibration beam from the first light inlet to the first light outlet, wherein a radiation frequency width of the calibration beam covers a frequency of the target-light-source beam.

16. The optical-path calibration module of claim 14, wherein the base defines a first through-hole on one side and defines a second through-hole on another side of the center of the base, and threaded pairs are disposed in each of the first through-hole and the second through-hole; the movable rotating shaft and the threaded pairs corresponding to the first through-hole and the second through-hole define a triangular plane, and a cap for any of the threaded pairs is rotatable with the movable rotating shaft as a fulcrum to adjust an inclination angle of the cover plate relative to the base.

17. The optical-path calibration module of claim 14, wherein the recess between the base and the cover plate comprises a first recess and a second recess, the first recess is located at an intersection of an X axis and a Y axis of the base, the second recess is located at an intersection of an X axis and a Y axis of the cover plate, and the movable rotating shaft is a supporting ball sandwiched by the first recess and the second recess.

18. The optical-path calibration module of claim 17, wherein the base defines at least one first blind-hole on a top surface of the base on the X axis and at least one second blind-hole at a side surface of the X axis, and the at least one second blind-hole extends to the at least one first blind-hole; the base defines at least one third blind-hole on the top surface of the base on the Y axis and at least one fourth blind-hole at a side surface of the Y axis, and the at least one fourth blind-hole extends to the at least one third blind-hole; and springs are received in the at least one first blind-hole and at least one third blind-hole respectively, lower spring-anchor-posts are inserted into the at least one second blind-hole and the at least one fourth blind-hole respectively, and the springs each have a lower end hooking a corresponding lower spring-anchor-post.

* * * * *